US008965928B2

(12) United States Patent
Telang (10) Patent No.: US 8,965,928 B2
(45) Date of Patent: Feb. 24, 2015

(54) SEARCHING FOR COMPUTER RESOURCES BASED ON ASSOCIATIONS BETWEEN THESE RESOURCES AND EXTERNAL EVENTS

(75) Inventor: Abhijit Anant Telang, Pune (IN)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 12/343,101

(22) Filed: Dec. 23, 2008

(65) Prior Publication Data

US 2010/0161578 A1  Jun. 24, 2010

(51) Int. Cl.
*G06F 17/30* (2006.01)

(52) U.S. Cl.
CPC .... *G06F 17/30528* (2013.01); *G06F 17/30997* (2013.01)
USPC .......................................... 707/791; 707/802

(58) Field of Classification Search
USPC ................................................. 707/791, 802
See application file for complete search history.

(56) References Cited

U.S. PATENT DOCUMENTS

| 5,600,834 | A | | 2/1997 | Howard | |
|---|---|---|---|---|---|
| 5,787,414 | A | * | 7/1998 | Miike et al. .................... | 715/243 |
| 7,546,317 | B1 | * | 6/2009 | Kaptelinin ......................... | 705/6 |
| 2001/0025256 | A1 | | 9/2001 | Oliphant et al. | |
| 2003/0126161 | A1 | * | 7/2003 | Wolff et al. ................... | 707/200 |
| 2004/0193594 | A1 | | 9/2004 | Moore et al. | |
| 2006/0195778 | A1 | | 8/2006 | Bendik | |
| 2007/0033166 | A1 | | 2/2007 | Trowbridge et al. | |
| 2007/0118661 | A1 | | 5/2007 | Vishwanathan et al. | |
| 2007/0136245 | A1 | * | 6/2007 | Hess et al. ......................... | 707/3 |
| 2007/0211871 | A1 | | 9/2007 | Sjolander et al. | |
| 2009/0171866 | A1 | * | 7/2009 | Harun et al. .................... | 706/12 |

OTHER PUBLICATIONS

Elsweiler, D., et al., "Dealing With Fragmented Recollection of Context Information Management," [online] Context-Based Information Retrieval (CIR-05) Workshop in Fifth International and Interdisciplinary Conference on Modeling and Using Context (CONTEXT-05) [retrieved Mar. 6, 2009] retrieved from the Internet: <http://sunsite.informatik.rwth-aachen.de/Publications/CEUR-WS/Vol-151/CIR-05_4.pdf>.

(Continued)

*Primary Examiner* — Khanh Pham
(74) *Attorney, Agent, or Firm* — Ingrid Foerster; Edell, Shapiro & Finnan, LLC (57) ABSTRACT

The invention provides a method and system for searching based on association of system resources a user was working on with external devices such as user's PDA, mobile phone, or printer and the system's interaction with such external devices. In one embodiment of the invention, a method is provided comprising a person using a resource on the computer and, during said using, engaging in another event; sending data to the computer related to said another event; and the computer creating an association between said another event and said resource. This embodiment also comprises sending a request to the computer to identify the resource that was being used by said person at the time of said another event; and the computer, acting in response to said request, using said association to identify said resource.

21 Claims, 4 Drawing Sheets

(56) References Cited

OTHER PUBLICATIONS

Soules, C.A.N., et al., "Connections: Using Context to Enhance File Search," [online] ACM SIGOPS Operating Systems Review, vol. 39, No. 5, pp. 119-132, Dec. 2005 [retrieved Mar. 6, 2009] retrieved from the Internet: <http://www.pdl.cmu.edu/PDL-FTP/ABN/soules-sosp05.pdf>.

"The CosmOS Operating System Project," The Cosmos Project, [retrieved Mar. 6, 2009] retrieved from the Internet: <http://members.simunex.com/sbalmos/CosmOS.pdf>.

\* cited by examiner

FIG. 1

| SYSTEM RESOURCE NAME | LOCATION | PERIPHERAL DEVICE 1 | PERIPHERAL DEVICE 2 . . . . | PERIPHERAL DEVICE N . . . . |
|---|---|---|---|---|
| Resume.doc 55 | C:\my Documents | MOBILE PHONE CONNECTED USING (IR/BLUETOOTH OR DATA CABLE) | PRINTER CONNECTED VIA BLUETOOTH LINK OR OVER NETWORK | |
| B1.ppt 40 | C:\work | MOBILE PHONE CONNECTED USING (IR/BLUETOOTH OR DATA CABLE) | PRINTER CONNECTED VIA BLUETOOTH LINK OR OVER NETWORK | |
| Pricing.xls 55 | C:\work\sales | MOBILE PHONE CONNECTED USING (IR/BLUETOOTH OR DATA CABLE) | PRINTER CONNECTED VIA BLUETOOTH LINK OR OVER NETWORK | |

PERIPHERAL EVENTS ASSOCIATED WITH Resume.doc RESOURCE i) MOBILE PHONE

| DEVICE NAME | TIME STAMP | CALLS | PHONE ALERTS | USER ACTION |
|---|---|---|---|---|
| NOKIA N 95 | MARCH 16, 2008 13:40 13:50 13:52 13:55 13:59 14:05 14:10 14:30 | INCOMING: 1)9890111222 2) ANITA 3) SAM OUTGOING: 1) X 2) Y | BATTERY LOW MEMORY FULL | ADDED 9890111222 TO CONTACT LIST | ii) PRINTER

| DEVICE NAME | TIME STAMP | RESOURCE NAME | STATUS |
|---|---|---|---|
| IBM INFO PRINT 2310 | MARCH 16, 2008 13:48 | Coversheet.doc | FAILED TO PRINT |

SEARCHING FOR COMPUTER RESOURCES BASED ON ASSOCIATIONS BETWEEN THESE RESOURCES AND EXTERNAL EVENTS

BACKGROUND OF THE INVENTION

1. Field of the Invention

This invention generally relates to using a computer to search for resources such as data or files. More specifically, the invention relates to searching for computer resources based on associations between those resources and external events.

2. Background Art

Conventional computer operating systems have the capability to search for files and folders based on a number of criteria, including file name, file extension, specific phrase or keyword inside the file, time last modified, and size. Most often these searches are useful when the user has information about these details. However, sometime people do not have such details. Also, sometimes people recall information that is not directly relevant to the applications they were working on, and would like the computer to conduct a search based on such information. The present limitation in conventional computer searches is that they work on objects or events within the computer system, such as searching file objects based on creation or modification of date and time, name or extension.

Attempts have been made to record incident logs in a computer or data processing system. The incident information that is generated is for events happening within the system, for instance within a mobile phone system or a personal computer. It does not extend to key events happening in other systems or to external system events.

SUMMARY OF THE INVENTION

Embodiments of the invention provide a method, system and computer program product for using a computer to search for resources. In one embodiment of the invention, a method is provided comprising a person using a resource on the computer and, during said using, engaging in another event; sending data to the computer related to said another event; and the computer creating an association between said another event and said resource. This embodiment also comprises sending a request to the computer to identify the resource that was being used by said person at the time of said another event; and the computer, acting in response to said request, using said association to identify said resource.

As one example, the association between said another event and said resource may be stored in a relational database. As another example, an object oriented data model may be used to associate said another event and said resource.

In one embodiment, described in detail below, the invention associates events occurring in devices external to a computer—such as storage devices, mobile phone devices, printers, and so on—with tasks or objects a user is working with on the computer. This association can be used for searching across all the peripheral devices. Such capability makes the computers more intuitive and smarter to work with. This is because people will be able to search the tasks they were working on by recalling commonplace events, such as receiving a call from friend, and the latter, which are much easier to remember than file names or date/time information.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Generally, in accordance with the present invention, a computer system associates a resource on which a user was working, with events occurring in various devices that a user used at the time the user was working on that resource. The computer system later uses that association to perform a search for that resource or a related resource. This capability makes computers more intuitive and smarter to work with, as people are able to search the tasks on which they were working by recalling commonplace events, such as receiving a call from friend or vice versa, which are often much easier to remember than file names or date/time information.

In order to achieve this the computer systems are made pervasive by gathering events or data from various devices or peripherals of a computing device. Human memory is based on the association of disparate information obtained from various sources. This invention emulates that by collecting information about events from peripheral devices that are connected to nearby, or used at the same times as a computer, and using that information to recall the objects the user was working with, or actions the user was doing, at the time these other events occurred.

In an embodiment of the present invention, the operating system records additional information, which will be described below, in addition to the application resource name, type, location, timestamp, and username. The search options available in today's operating system are able to search the files based on a given name or modified time stamp. However, today's operating systems are limited in that they are not able to perform a search on system objects based on events happening within peripheral devices at a given time, or on operations the user performed on those devices, such as making a call on a mobile phone or using a printer.

Figure 1:
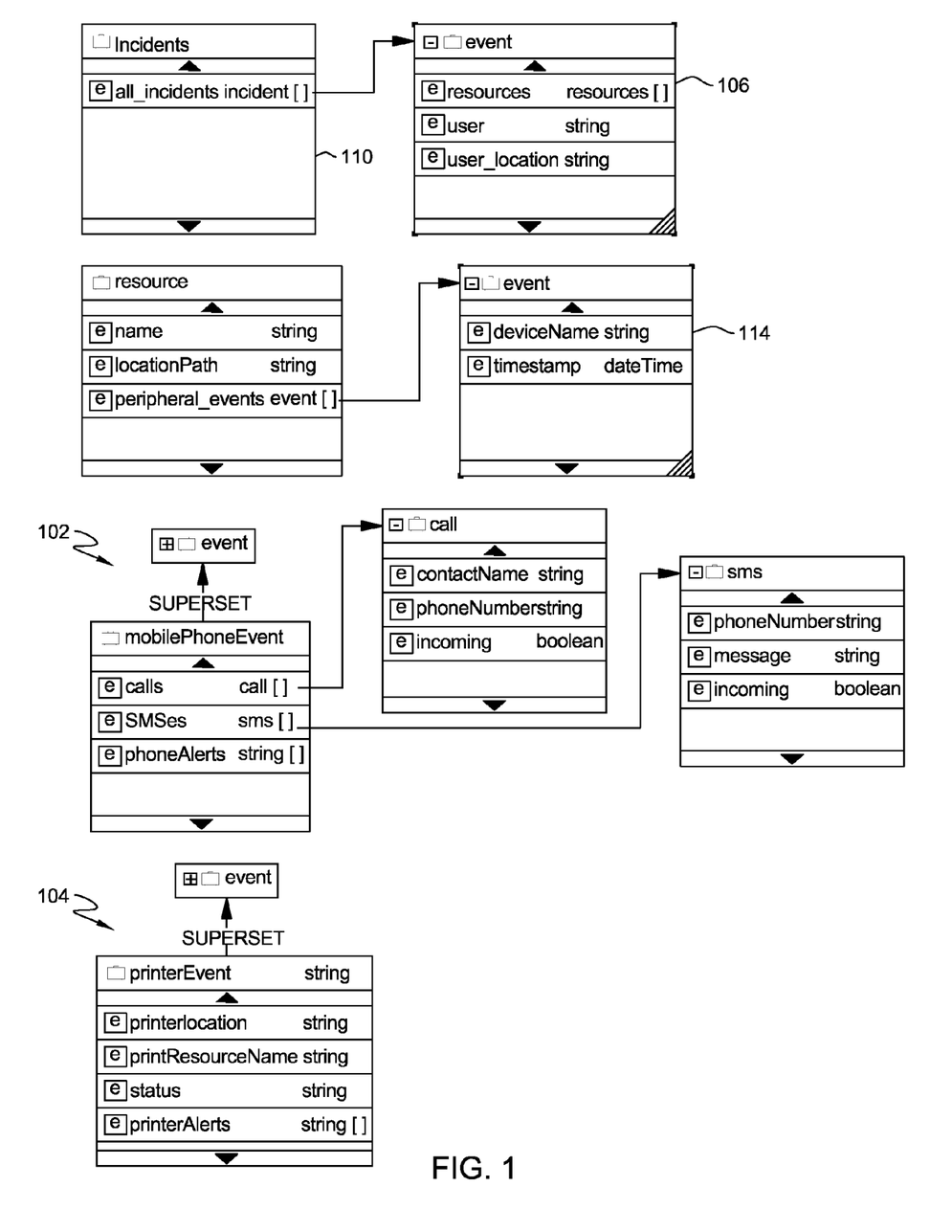
FIG. 1 is a conceptual representation of an incident event model that accounts for storing peripheral events and relating those events to objects in a computer system.

FIG. 1 illustrates various events that can be associated with a computer object or resource. For example, as represented at 102, information about telephone calls to or from a mobile phone, or information about SMS messages may be recorded for association with a computer object or action. Printer events may also be recorded, as represented at 104, for the same purpose. In addition, an incident log 106 may be kept of incidents, and an incident log 110 may be kept to store information about individual incidents. A resource record 112 may be kept to record information about resources on the computer system, and an event record 114 may be kept to store information about individual events.

Figure 2:
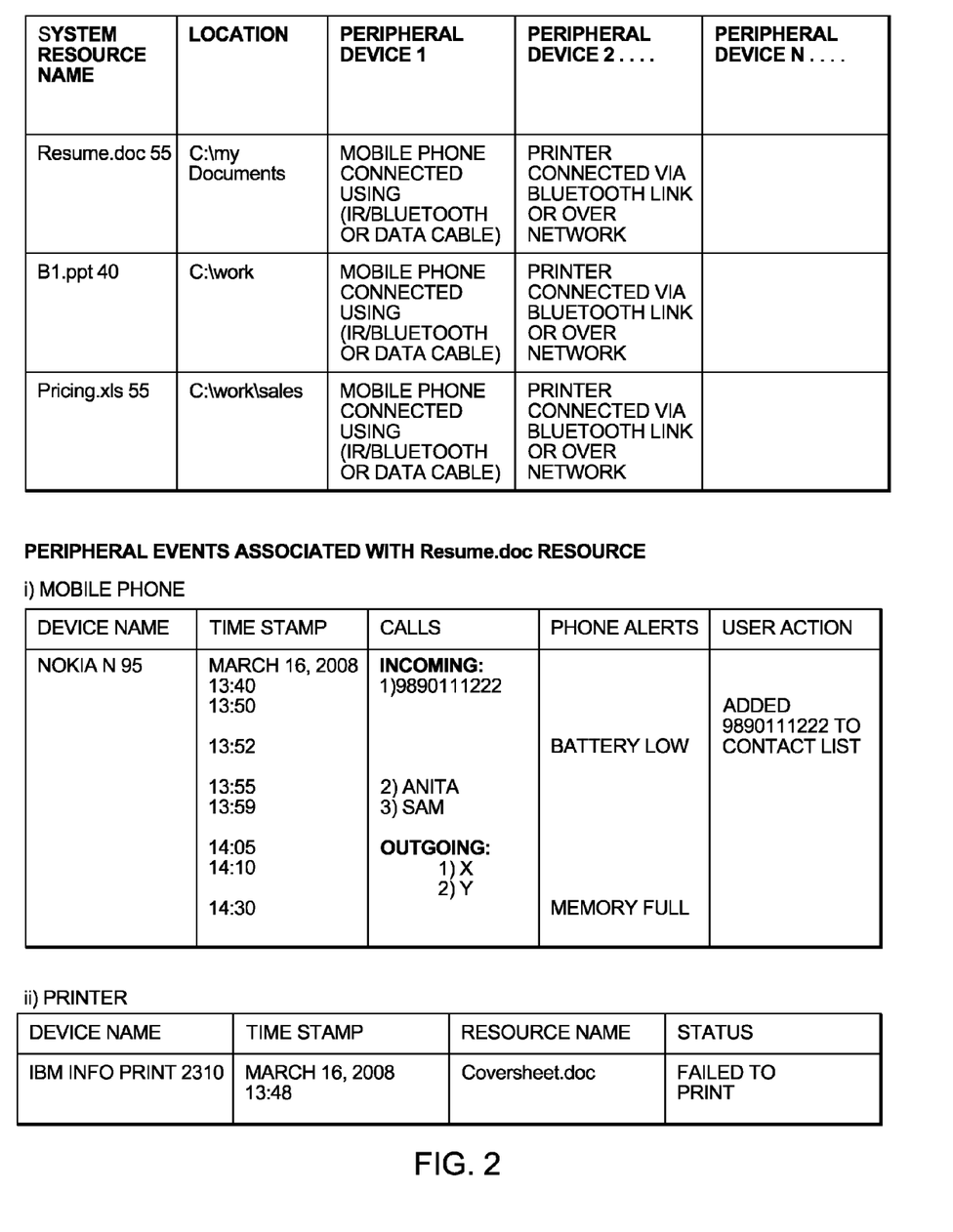
FIG. 2 is a table illustrating typical information that may be stored in incident logs as a user works with objects in a computer system.

The following discussion gives an example that illustrates the utility of a search based on external stimulus. Namely, FIG. 2 illustrates an incident log for a specific user, named Joe, for Mar. 16, 2008. Based on the log, Joe can get the system to return the resources he was working on while he received a call from a person named Anita on his mobile phone, which would be one or more of Resume.doc 25, B1.ppt 40, and Pricing.xls 55. Also, the system can now support another query such as "Who called Joe when a particular document was being modified." One can see that Joe received calls from Anita, Sam and an unknown caller from phone number 9890111222 when Joe was working on his resume.

Object Oriented Data of Incident Log

Figure 3:
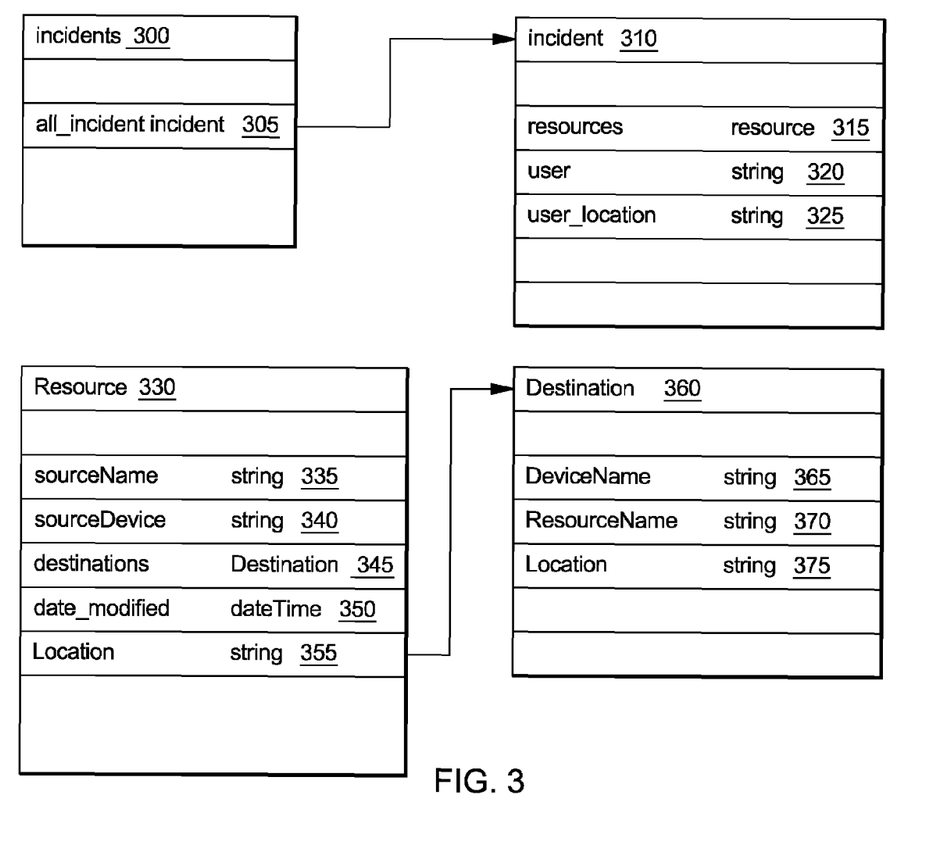
FIG. 3 is a block diagram depicting an object oriented data model of an incident log.

Operating systems may use a relational database or equivalent to store the incident information. An alternative to using a conventional relational database for storing logs is to use an object oriented data model as depicted in FIG. 3.

In the log, each system resource is represented as an object with properties. The incidents log 300 is a collection of objects a user was working with. The user location 325 is represented as a property for the incident log entry 310 for that particular location. A collection of incident logs 310 form the main incidents log 300.

The destination object 360 represents the storage devices a particular resource is saved to. In the embodiment shown, this object has properties such as resource location 375, device name 365, and name 370 of the system resource on this device. A resource object 330 may have a list of destinations 345. For instance, Joe's resume could be stored on a CD, a pen drive, and a flash drive, apart from the computer system itself.

Mobile Devices

Figure 4:
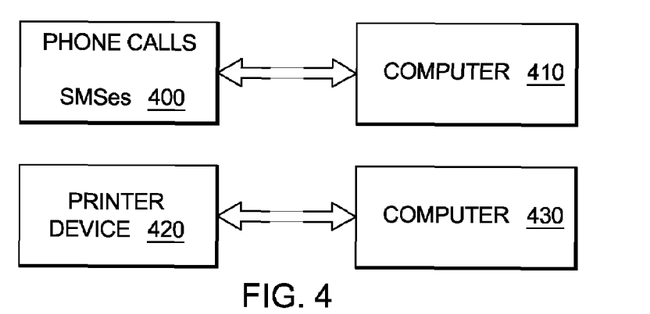
FIG. 4 is a block diagram illustrating the interaction of phone calls, short message service messages (SMSes), and printer devices with a computer system.

FIG. 4 is a block diagram illustrating the interaction of phone calls, SMSes, and printer devices with a computer system. Another example of an embodiment of this invention uses the incoming/outgoing calls and/or SMSes 400, to or from the user, Joe, when Joe is working on a presentation. Joe may not remember the name of the file, but he may be able to vividly remember a call from an important client or his wife.

In another embodiment, the invention associates calls received on a cell phone while working on a document on a computer. When a user receives a particular call on his cell phone or landline, this information can be made available to a desktop computer 410 from time to time through an infrared, Bluetooth link or a data cable if the phone is connected to the computer.

As another example of an embodiment of the present invention, when a person opens a particular document on a computer, the computer operating system gives the person the option to send a command to his or her cell phone (if the cell phone is in range) to display all the numbers dialed or calls received the last time the person was working on the document.

All the phone 400 needs to retrieve this data is date/time stamp information. The desktop computer 410 may supply such information to the mobile device 400 in a mutually agreeable format over, for example, a data cable, an infrared link or a Bluetooth network. When the phone 400 receives the request for this information, the phone will search its memory or sim card memory to retrieve information about the calls and messages sent or received during the relevant time period.

The user can be more specific as well. The user might say, for example, "Give me only the incoming calls the last time I worked on this document." So along with the date/time information, an operation type is also sent to the mobile device 400. Such an operation type, in an embodiment, has predefined values appropriate to the functionality offered by a peripheral device.

Phone calls may be incoming calls, outgoing calls, incoming messages, and outgoing messages. For instance, while browsing through the outgoing call list, a person may select a contact and send a "query" command to the desktop computer 410. The phone 400 sends this date/time stamp and caller information to the computer system to query against.

Since the association between date/time, caller id, etc, has already been made in the computer system, the computer system can easily look up all associated system objects and present them to the user on the desktop screen.

With prior art devices, users can only synchronize static address books, calendars or file objects between phone and computer. Embodiments of the present invention are able to synchronize transactional information happening in real time.

In the case of phone calls, the information that can be shared with other devices includes, but is not limited to: 1) caller ID (contact name if in address book), 2) date/time call arrived or made (incoming or outgoing), and 3) duration of call. In the case of SMSes, the information that can be shared with other devices includes, but is not limited to: 1) sender's/receiver's phone number, and 2) date/time SMS sent/arrived.

Printer Devices

The following information may be already available, or, if not, may be communicated by a printer server 420 to a desktop computer 430: 1) printer location, 2) user/computer IP addresses/names that sent the print jobs, 3) names of documents which were sent for printing, 4) number of copies to be printed, 5) date/time stamp at which the documents were sent to print, and 6) the result of the print request, such as failed printing, successful, etc.

The computer 430 uses this information to form associations with file objects in order to search for these objects at a later time. One way to form these associations is to treat such external information as transactional attributes of file objects. The computer system can use these attributes to entertain queries such as: 1) "Give me the documents I tried to print but failed at the office today when I was listening to a particular song on my IPOD", or 2) "Give me the documents <file objects> 1 <user> was working on when I got a call <external event> from so and so person yesterday <date/time info>".

Workplace Recovery Based on External Events

In addition to offering a new way to search, the functionality provided by embodiments of this invention can be used to quickly launch the resources on which a user was working, based on the user's interaction with peripheral devices. Therefore, in the example discussed in connection with FIG. 2, Joe can now ask the computer system to launch all applications or open resources he was working with when, for instance, he was on a telephone call with a given person, or downloaded an area map on his PDA, or was playing a particular music number on his portable music player, or added someone to his contact list, and so on.

Figure 5:
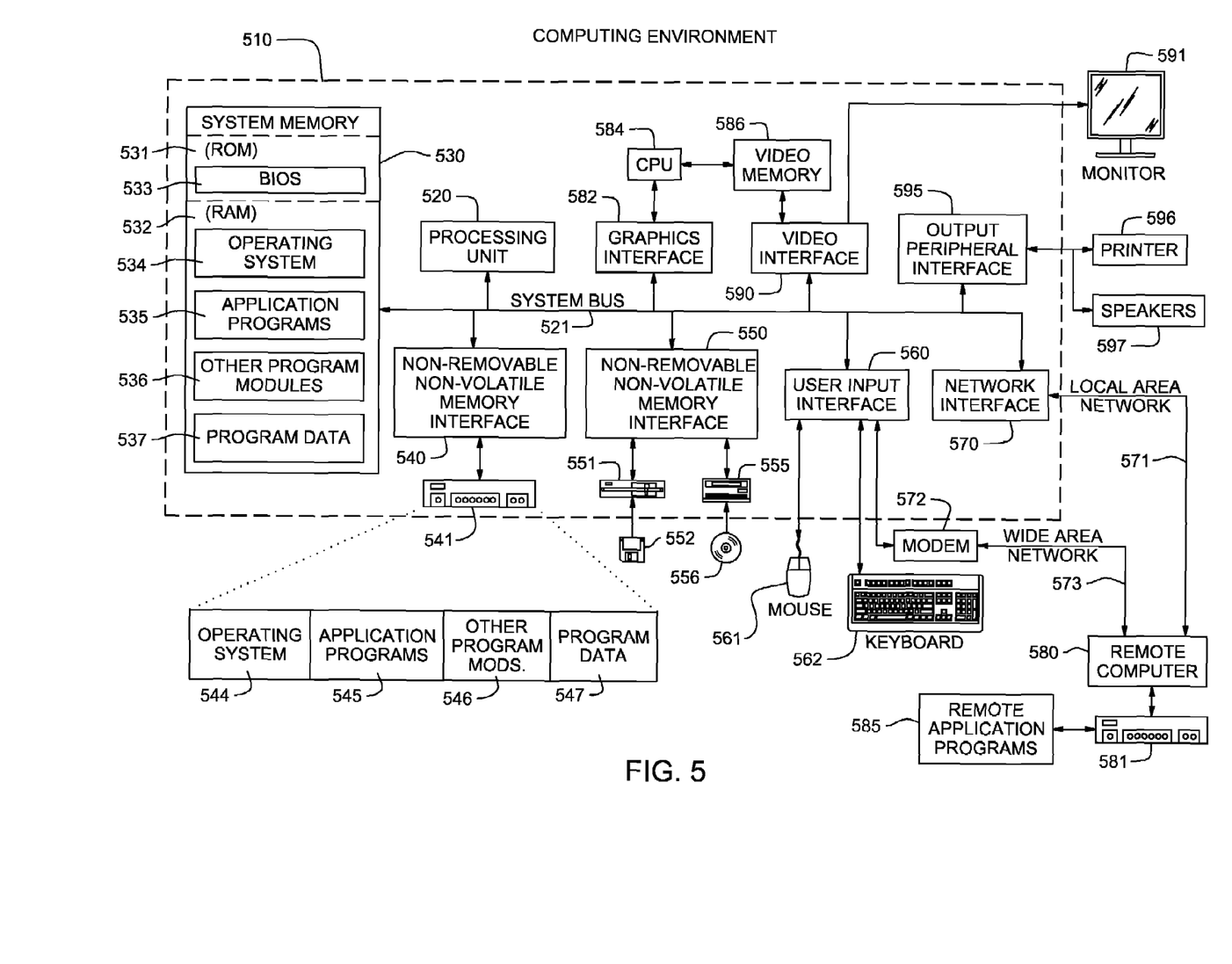
FIG. 5 is an exemplary diagram of a computing environment in which the present invention may be implemented.

For example, FIG. 5 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 5, thus, illustrates an example of a suitable computing system environment 500 in which the invention may be implemented, although as made clear above, the computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500. With reference to FIG. 5, an exemplary system for implementing the invention includes a general purpose-computing device in the form of a computer 510. Components of computer 510 may include, but are not limited to, a processing unit 520, a system memory 530, and a system bus 521 that couples various system components including the system memory to the processing unit

520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrate a bard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating System 544, application programs 545, other program modules 546, and program data 547 are given different numbers here to illustrate that, at a minimum, they are different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. A graphics interface 582, such as Northbridge, may also be connected to the system bus 521. Northbridge is a chipset that communicates with the CPU, or host-processing unit 520, and assumes responsibility for accelerated graphics port (AGP) communications. One or more graphics processing units (GPUs) 584 may communicate with graphics interface 582. In this regard, GPUs 584 generally include on-chip memory storage, such as register storage and GPUs 584 communicate with a video memory 586. GPUs 584, however, are but one example of a coprocessor and, thus, a variety of co-processing devices may be included in computer 510. A monitor 591 or other type of display device is also connected to the system bus 521 via an interface, such as a video interface 590, which may in turn communicate with video memory 586. In addition to monitor 591, computers may also include other peripheral output devices such as speakers 297 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 281 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 2 illustrates remote application programs 585 as residing on memory device 581. It will be appreciated that the network connections shown are exemplary and other means of establishing a communications link between the computers may be used.

One of ordinary skill in the art can appreciate that a computer 510 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of identifying a computer resource that was being used by a person at a computer while engaging in another event on a device other than the computer, comprising:
   receiving, at the computer from the other device, data relating to the event on the other device, wherein the event on the other device includes a communication with a second person and occurs during use of the computer resource by the person on the computer;
   creating, at the computer, an association between the event on the other device and the computer resource;
   receiving from a user, at the computer at respective later times after completion of the event and use of the computer resource, a resource request for accessing the computer resource including an identification of the event on the other device and an event request for accessing the communication including an identification of the computer resource;
   identifying, at the computer based on the identification of the event in the resource request, the computer resource used during occurrence of the event using the created association;
   identifying, at the computer based on the identification of the computer resource in the event request, information pertaining to the second person and the communication that occurred on the other device during use of the computer resource using the created association; and
   in response to subsequent use computer resource on the computer, sending a command to the other device including time information to determine and display on the other device information for each event on the other device pertaining to the person and occurring during the use of the computer resource on the computer.

2. The method according to claim 1 further including storing the association in a relational database.

3. The method according to claim 2 farther including storing received data relating to the event in the relational database.

4. The method according to claim 1, wherein the creating the association between the event and the computer resource includes using an object oriented data model to associate the event and the computer resource.

5. The method according to claim 1, wherein the other device includes one of a phone and a Personal Digital Assistant.

6. The method according to claim 1, wherein the data relating to the event is received while the person is engaging in the event.

7. The method according to claim 1 further comprising:
   maintaining, at the computer, an incidents log of data related to events engaged in by the person; and
   using the incidents log in identifying the computer resource.

8. The method according to claim 1 further comprising:
   determining whether the person using the computer resource had previously used the same computer resource; and
   using created associations to identify at least one event engaged in by the person during a prior use of the same computer resource.

9. The method according to claim 1, further including at the time of receiving the resource request, identifying the current location of the computer resource.

10. The method according to claim 1 further comprising:
    recovering a workplace provided by the computer during occurrence of the event indicated by the identification in the resource request by automatically launching one or more applications and opening the computer resource that were used during occurrence of the indicated event.

11. A system for identifying a computer resource that was being used by a person at a computer while engaging in another event on a device other than the computer, wherein the system comprises one or more processor units on the computer and configured to:
    receive, at the computer from the other device, data relating to the event on the other device, wherein the event on the other device includes a communication with a second person and occurs during use of the computer resource by the person on the computer;
    create, at the computer, an association between the event on the other device and the computer resource;
    receive from a user, at the computer at respective later times after completion of the event and use of the computer resource, a resource request for accessing the computer resource including an identification of the event on the other device and an event request for accessing the communication including an identification of the computer resource;
    identify, at the computer based on the identification of the event in the resource request, the computer resource used during occurrence of the event using the created association;
    identify, at the computer based on the identification of the computer resource in the event request, information pertaining to the second person and the communication that occurred on the other device during use of the computer resource using the created association; and
    in response to a subsequent use of the computer resource on the computer, send a command to the other device including time information to determine and display on the other device information for each event on the other device pertaining to the person and occurring during the us of the computer resource on the computer.

12. The system according to claim 11, wherein the one or more processor units on the computer are further configured to:
   store said association in a relational database.

13. The system according to claim 11, wherein the one or more processor units on the computer are further configured to:
   use an object oriented data model to associate the event and the computer resource.

14. The system according to claim 11, wherein the one or more processor units on the computer are further configured to receive the data while the person is engaging in the event.

15. The system according to claim 11, wherein the one or more processor units on the computer are further configured to:
   recover a workplace provided by the computer during occurrence of the event indicated by the identification in the resource request by automatically launching one or more applications and opening the computer resource that were used during occurrence of the indicated event.

16. An article of manufacture comprising:
   at least one non-transitory computer usable medium having computer readable program code logic to execute a machine instruction in a processing unit for a computer so as to identify a computer resource that was being used by a person at the computer while engaging in another event on a device other than the computer, the computer readable program code logic, when executing, performing the following:
   receiving, at the computer from the other device, data relating to the event on the other device, wherein the event on the other device includes a communication with a second person and occurs during use of the computer resource by the person on the computer;
   creating, at the computer, an association between the event on the other device and the computer resource;
   receiving from a user, at the computer at respective later times after completion of the event and use of the computer resource, a resource request for accessing the computer resource including an identification of the event on the other device and an event request for accessing the communication including an identification of the computer resource;
   identifying, at the computer based on the identification of the event in the resource request, the computer resource used during occurrence of the event using the created association;
   identifying, at the computer based on the identification of the computer resource in the event request, information pertaining to the second person and the communication that occurred on the other device during use of the computer resource using the created association; and
   in response to a subsequent use of the computer resource on the computer, sending a command to the other device including time information to determine and display on the other device information for each event on the other device pertaining to the person and occurring, during the use of the computer resource on the computer.

17. The article of manufacture according to claim 16, wherein the computer readable program code logic, when executing, further performs the following:
   storing the association in a relational database.

18. The article of manufacture according to claim 16, wherein the computer readable program code logic, when executing, further performs the following:
   using an object oriented data model to associate the event and the computer resource.

19. The article of manufacture according to claim 16, wherein, when the computer resource has been used a first time and a second time that is subsequent to the first time, the computer readable program code logic, when executing, further performs the following:
   during use of the computer resource the second time, identifying one or more activities of the person during use of the computer resource the first time.

20. The article of manufacture according to claim 16, wherein the computer resource is not located on the computer, and the computer readable program code logic, when executing, further performs the following:
   using the association to identify where the computer resource is located.

21. The article of manufacture according to claim 16, wherein the computer readable program code logic, when executing, further performs the following:
   recovering a workplace provided by the computer during occurrence of the event indicated by the identification in the resource request by automatically launching one or more applications and opening the computer resource that were used during occurrence of the indicated event.

* * * * *